(12) United States Patent
Wang et al.

(10) Patent No.: US 11,580,417 B2
(45) Date of Patent: Feb. 14, 2023

(54) SYSTEM AND METHOD FOR PROCESSING DATA AND MANAGING INFORMATION

(71) Applicant: City University of Hong Kong, Kowloon (HK)

(72) Inventors: Cong Wang, Kowloon Tong (HK); Yifeng Zheng, Kowloon Tong (HK); Chengjun Cai, Kowloon Tong (HK)

(73) Assignee: City University of Hong Kong, Kowloon (HK)

( * ) Notice: Subject to any disclaimer, the term of this patent is extended or adjusted under 35 U.S.C. 154(b) by 1017 days.

(21) Appl. No.: 16/030,980

(22) Filed: Jul. 10, 2018

(65) Prior Publication Data

US 2020/0019865 A1  Jan. 16, 2020

(51) Int. Cl.
    *G06N 5/022*  (2023.01)
(52) U.S. Cl.
    CPC .................. *G06N 5/022* (2013.01)
(58) Field of Classification Search
    CPC ........... G06N 5/00; G06N 5/02; G06N 5/022; G06N 20/00; G06N 20/10; G06N 20/20; G06N 5/04; G06N 7/00; G06N 7/005
    See application file for complete search history.

(56) References Cited

U.S. PATENT DOCUMENTS

| | | | |
|---|---|---|---|
| 10,068,228 B1 * | 9/2018 | Winklevoss | ............ H04L 9/085 |
| 2010/0293129 A1 | 11/2010 | Dong et al. | |
| 2013/0273901 A1 | 10/2013 | Calo et al. | |
| 2013/0275569 A1 | 10/2013 | Calo et al. | |
| 2015/0304797 A1 | 10/2015 | Rhoads et al. | |
| 2016/0171514 A1 | 6/2016 | Frank et al. | |
| 2017/0230189 A1 | 8/2017 | Toll et al. | |
| 2019/0165949 A1 * | 5/2019 | Ramos | .................. H04L 9/3247 |
| 2019/0237169 A1 * | 8/2019 | Culver | ............... G06Q 30/0207 |

OTHER PUBLICATIONS

Yaga et al., "Blockchain Technology Overview", Jan. 2018 https://csrc.nist.gov/publications/detail/nistir/8202/archive/2018-01-24 (Year: 2018).*

(Continued)

*Primary Examiner* — Kamran Afshar
*Assistant Examiner* — Shoun J Abraham
(74) *Attorney, Agent, or Firm* — Renner Kenner Greive Bobak Taylor & Weber Co., LPA

(57) ABSTRACT

A method including receiving, at multiple cloud computing servers, multiple streaming data sets for the same sensing task each from a respective client device. The streaming data set from each client device comprises sensed data sensed by one or more sensors of said client device. The streaming data sets are encrypted. Each respective streaming data set from a respective client device is divided into multiple streaming data set portions, each to be received at a respective one of the cloud computing server. The method also includes processing, at each respective cloud computing server, the corresponding streaming data set portions received to generate a corresponding share of a result for the sensing task. The method also includes encrypting, at each respective one of the cloud computing servers, the corresponding share of the result; and facilitating creation or update of a blockchain based on the encrypted shares of the result.

18 Claims, 9 Drawing Sheets

(56) References Cited

OTHER PUBLICATIONS

Vergara-Laurens et al., "Privacy-Preserving Mechanisms for Crowdsensing: Survey and Research Challenges", Jul. 2016 https://ieeexplore.ieee.org/abstract/document/7523231 (Year: 2016).*
Lu et al., "ZebraLancer: Private and Anonymous Crowdsourcing System atop Open Blockchain", Jul. 2018 (Year: 2018).*
Ganti et al. "Mobile crowdsensing: current state and future challenges", Nov. 2011 https://ieeexplore.ieee.org/abstract/document/6069707 (Year: 2011).*
Wang et al. "Catch me in the dark: Effective privacy-preserving outsourcing of feature extractions over image data", Jul. 2016 https://ieeexplore.ieee.org/abstract/document/7524460 (Year: 2016).*
Mohassel et al. "SecureML: A System for Scalable Privacy-Preserving Machine Learning", 2017 https://ieeexplore.ieee.org/stamp/stamp.jsp?tp=&arnumber=7958569&tag=1 (Year: 2017).*
Xiao et al. "Secret-sharing-based secure user recruitment protocol for mobile crowdsensing", 2017 https://ieeexplore.ieee.org/abstract/document/8057032 (Year: 2017).*
Wang et al. "A Blockchain Based Privacy-Preserving Incentive Mechanism in Crowdsensing Applications", Mar. 2018 https://ieeexplore.ieee.org/abstract/document/8306424 (Year: 2018).*

\* cited by examiner

Algorithm 1 Streaming Truth Discovery

Input: Decay rate: $\lambda$; data stream: $\{f_1, f_2, \cdots\}$, where $f_l = \{x_l^1, \cdots, x_l^k\}$.

Output: Truth at each epoch $\{\Phi_1, \Phi_2, \cdots\}$.

1: Initialize each client weight $w_k = 1$ and accumulated distance $st(k) = 0$.
2: for each epoch $l \in \{1, 2, \cdots, \mathcal{E}\}$ do
3:     $\Phi_l \leftarrow \frac{\sum_{k=1}^{K} w_k \cdot x_l^k}{\sum_{k=1}^{K} w_k}$                       (1)
     // Truth update via the currently incoming data
4:     $st(k) \leftarrow st(k) \cdot \lambda + d_m(\Phi_l, x_l^k)$.        (2)
     // Update the accumulated distances
5:     $w_k \leftarrow -\log(\frac{st(k)}{\sum_{k=1}^{K} st(k)})$.              (3)
     // Client weights update
6:     Return $\Phi_l$ and renew $\{st(k), w_k\}_{k=1}^{K}$.
7: end for

Figure 2

Truth shares update($l, \{([x_l^k]_i, [w_k]_i, [\text{Trio}_0]_i)_{i \in \{0,1\}}\}_{k=1}^{K}$):

At epoch $l = 1$:
1. Initialize $w_k = 1$ and state $[st(k)]_i = 0$ for all clients.
2. $S_i$ computes obtains a share of truth $\Phi_i$ via $$\Phi_i = \frac{\sum_{k=1}^{K} \text{Mul}_c([x_l^k]_i, w_k)}{\sum_{k=1}^{K} w_k} \quad (a)$$

At subsequent epochs ($l \geq 2$):
3. $S_i$ computes a share of weighted sum $t$ via $$[t]_i = \sum_{k=1}^{K} \text{Mul}_{tri}([x_l^k]_i, [w_k]_i) \quad (b)$$

4. $S_i$ computes $[z]_i = \sum_{k=1}^{K} [w_k]_i$ and truth share $\Phi_i$ via $$\Phi_i = \text{GC}_{div}([t]_i, [z]_i) \quad (c)$$

// $\Phi = ([t]_0 + [t]_1) / \sum_{k=1}^{K} ([w_k]_0 + [w_k]_1).$

Figure 3

Weight shares update($l, \{\Phi_i, ([x_l^k]_i, [st(k)]_i, [\mathbf{Tri}_1]_i)_{k=1}^K\}_{i \in \{0,1\}}$):

At epochs ($l \geq 1$):

For each client $k$:
1. $\mathcal{S}_i$ computes $[d]_i = ([x_l^k]_i - \Phi_i)$.
2. $\mathcal{S}_i$ computes a square error share $[(x_l^k - \Phi)^2]_i$ via $$[d_k]_i = \text{Mul}_{tri}([d]_i, [d]_i) \qquad (d)$$

3. $\mathcal{S}_i$ updates client $k$'s state via $[st(k)]_i = [st(k)]_i \cdot \lambda + [d_k]_i$.
4. $\mathcal{S}_i$ sums up all states via $[st^*]_i = \sum_{k=1}^K [st(k)]_i$.
5. $\mathcal{S}_i$ updates the weight share $[w_k]_i$ via $$[w_k]_i = \text{GC}_{\text{div}+\log}([st(k)]_i, [st^*]_i) \qquad (e)$$

// $w_k = -\log[([st(k)]_0 + [st(k)]_1)/([st^*]_0 + [st^*]_1)]$.

Figure 4

Blockchain$_{KM}$($C, S_0, S_1, \{\mathcal{P}_k\}_{k=1}^{K}, T_1, T_2$)
Commit: upon receiving commit from server $S_i$:
    assert current time $T \leq T_1$.
    assert $id \notin$ Market.
    add ($id, \mathbf{cm}_{key_i}$) to Market and store $c_i, \{wt_k^i\}_{k=1}^{K}$.

Figure 5

Blockchain$_{KM}$($C, S_0, S_1, \{\mathcal{P}_k\}_{k=1}^{K}, T_1, T_2$)
Offer: upon receiving pay from requester $C$:
    assert current time $T_1 \leq T < T_2$.
    assert ledger[$C$] $\geq$ $offer.
    assert $id \in$ Market.
    send (pay, $id$, $offer, $ct_i$) to $S_i$, for $i \in \{0, 1\}$.

Figure 6

$\text{Blockchain}_{KM}(\mathcal{C}, \mathcal{S}_0, \mathcal{S}_1, \{\mathcal{P}_k\}_{k=1}^{K}, T_1, T_2)$

Harvest: on receiving harvest from $\mathcal{S}_0$ and $\mathcal{S}_1$:

assert current time $T \geq T_2$.

assert $id \in \text{Market}$.

assert $\mathbf{cm}_{key_i} = \text{Comm}(key_i)$, for $i \in \{0, 1\}$.

$\text{ledger}[C] := \text{ledger}[C] - \$\text{offer}$.

remove $(id, \mathbf{cm}_{key_0}, \mathbf{cm}_{key_1})$ from Market.

send $\text{harvest}_c := (key_0, key_1, sn_0, sn_1)$ to $\mathcal{C}$.

$\text{ledger}[\mathcal{S}_i] := \text{ledger}[\mathcal{S}_i] + \frac{1}{2}\$\text{offer}$, for $i \in \{0, 1\}$.

for $k \in [K]$:

unmask weight share $[w_k]_i := \text{XOR}(wt_k^i, p_k^i)$, for $i \in \{0, 1\}$.

recover $w_k = [w_k]_0 + [w_k]_1$.

$\text{ledger}[\mathcal{P}_k] := \text{ledger}[\mathcal{P}_k] + \$\text{coffer} \cdot Deg(w_k)$.

Figure 7

SYSTEM AND METHOD FOR PROCESSING DATA AND MANAGING INFORMATION

TECHNICAL FIELD

The invention relates to a system and method for processing data and managing information. Particularly, although not exclusively, the invention also relates to a system and method for managing and facilitating transaction of information.

BACKGROUND

Leveraging the wisdom of crowd for knowledge discovery has become increasingly popular. With a rapid growing popularity, various emerging applications have been enabled. These applications include medical diagnosis, smart transportation, environmental monitoring, etc.

Given the proliferation of mobile devices with sensing and computing capabilities, one way for leveraging the wisdom of crowd is crowdsensing or crowdsourcing data with proper aggregation and management mechanisms. In order to obtain high-quality knowledge from the data collected from various client devices, truth discovery has received considerable attention and is beginning to be adopted.

SUMMARY OF THE INVENTION

In accordance with a first aspect of the invention, there is provided a method for processing data and managing information, comprising: receiving, at a server, streaming data from a plurality of client devices; processing the streaming data received at the server to generate useful information from the data; and storing the useful information at the server; wherein the streaming data is encrypted; and wherein the server comprises a plurality of cloud computing servers operably connected with each other.

Preferably, the streaming data comprises: data sensed by one or more sensors of the respective client device; or data inputted by respective user of the respective client device. In other words, the method can be applied for crowd-sensing or crowd-sourcing applications.

Preferably, the streaming data is encrypted by secret sharing.

Preferably, the processing step comprises updating an existing useful information. The updating step may include applying a weighting to the data associated with the existing useful information and the streaming data received. In one embodiment, the weighting comprises an exponential weighted moving average.

Preferably, the streaming data further comprises a data-quality-weighting of the respective client device. Preferably, the processing step comprises updating the data-quality-weighting of the respective client device based on the generated useful information. The updating step may include applying a weighting to prior data and the streaming data provided by the client device, wherein the weighting is higher for recent data and lower for old data.

Preferably, the processing step is conducted in a ciphertext domain at each respective cloud computing server.

Preferably, the sensed or inputted data from each of the client devices is divided into a plurality of portions each provided to a respective cloud computing server; and the plurality of cloud computing servers are each arranged to process the respective data to obtain an information share that forms part of the useful information. Preferably, the method further comprises encrypting, at each corresponding cloud computing server, corresponding information share s. The method may further include creating or updating a blockchain based on all of the encrypted information shares. The server may host the created or updated blockchain.

Preferably, the method further comprises hosting the useful information at the server for purchase.

Preferably, the method further comprises receiving, from a requester device, an indication of interest to purchase the useful information; processing the indication of interest at the server to determine whether to provide the useful information to the requester device; providing the useful information to the requester device upon determining that the useful information should be provided to the requester device. The indication of interest may comprise a purchase request, preferably with a payment.

Preferably, the payment from the requester device to the server and the provision of the useful information to the requester device from the server occur substantially simultaneously.

In one embodiment, the method further comprises removing the useful information from the server after providing the useful information to the requester device.

In one embodiment, the method further comprises providing a reward to the respective client devices upon providing the useful information to the requester device.

Preferably, an amount of the reward to the respective client device is based on a data-quality-weighting of the respective client device.

Preferably, the transaction of the useful information is based on blockchain. The useful information on the blockchain is preferably encrypted.

In accordance with a second aspect of the invention, there is provided a system for processing data and managing information, comprising: a server arranged to: receiving streaming data from a plurality of client devices; processing the streaming data received to generate useful information from the data; and storing the useful information; wherein the streaming data is encrypted; and wherein the server comprises a plurality of cloud computing servers operably connected with each other.

Preferably, the system in the second aspect is arranged to perform the method in the first aspect.

In accordance with a third aspect of the invention, there is provided non-transitory computer readable medium for storing computer instructions that, when executed by a plurality of cloud computing servers, causes the cloud computing servers to perform a method for processing data and managing information, comprising: receiving streaming data from a plurality of client devices; processing the streaming data received at the server to generate useful information from the data; and storing the useful information; wherein the streaming data is encrypted.

Preferably, the non-transitory computer readable medium in the third aspect is arranged to perform the method in the first aspect.

BRIEF DESCRIPTION OF THE DRAWINGS

Embodiments of the invention will now be described, by way of example, with reference to the accompanying drawings in which:

FIG. 2 shows a method for streaming truth discovery in one embodiment of the invention;

FIG. 3 shows a method for updating truth in encrypted streaming truth discovery in one embodiment of the invention;

FIG. 4 shows a method for updating weight (e.g., client's weight) in encrypted streaming truth discovery in one embodiment of the invention;

FIG. 5 shows the function of a blockchain in a commit phase of the blockchain-based knowledge monetization method in one embodiment of the invention;

FIG. 6 shows the function of a blockchain in an offer phase of the blockchain-based knowledge monetization method in one embodiment of the invention;

FIG. 7 shows the function of a blockchain in a harvest phase of the blockchain-based knowledge monetization method in one embodiment of the invention;

DETAILED DESCRIPTION OF THE PREFERRED EMBODIMENT

Overview

A. Architectural Model

Figure 1:
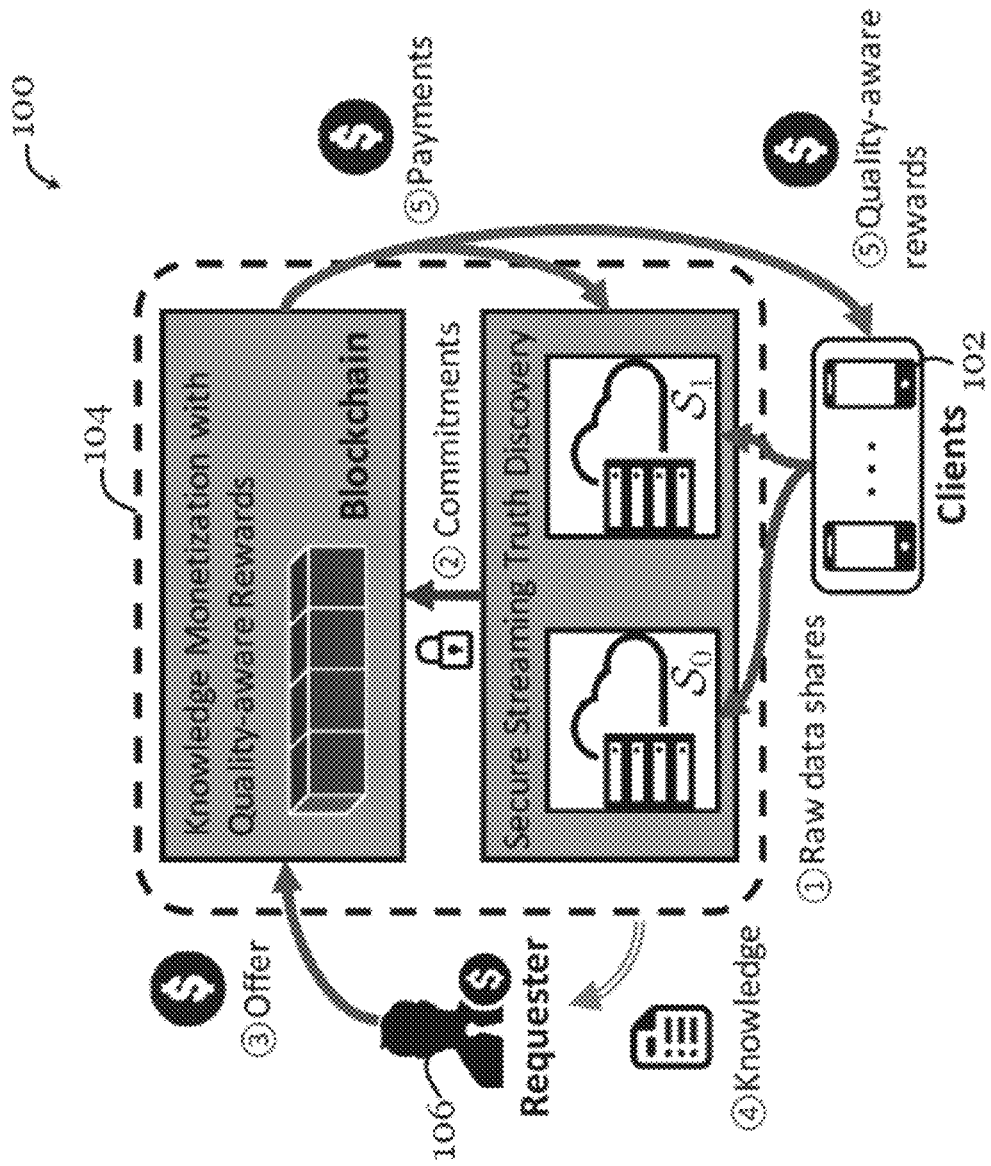
FIG. 1 is a schematic diagram illustrating a system for processing data and managing information in one embodiment of the invention.

In one embodiment of the invention, there is provided a privacy-aware crowdsensing framework that can efficiently leverage encrypted crowdsensed data streams to discover and sell knowledge. FIG. 1 illustrates the system architecture in this embodiment. As shown in FIG. 1, the system 100 generally includes three entities, i.e., client 102, cloud 104, and requester 106. These entities are implemented by information handling systems (such as that shown and described with respect to FIG. 14) and their associated users.

In this embodiment, clients 102 (client devices associated with users) are participants in crowdsensing applications (e.g., air quality monitoring and traffic monitoring). They are willing to perform sensing tasks and share the sensed data. The sensed data of the clients 102 are preferably encrypted for privacy protection. Monetary rewards may be provided to clients 102 in the system 100 as a reward. To achieve privacy protection and cost efficiency, the present embodiment uses a lightweight cryptographic technique, i.e., additive secret sharing, for encrypting the client's sensed data. In the present embodiment, at each epoch, a client 102 splits its sensed data into two shares for submission.

The cloud (or server) 104 is deployed for collecting and processing the encrypted data streams received from the clients. In this embodiment, the cloud entity includes two independent cloud servers, i.e., $S_0$ and $S_1$, each arranged to obtain a respective share of the sensed data of a client at every epoch. The two servers $S_0$ and $S_1$ jointly perform truth discovery in the ciphertext domain, then incrementally update the truth for each sensing task and update each client's weight. As a result, at each epoch, each cloud server obtains, respectively, one share of the truth for each sensing task as well as the client's weight. Such an encrypted truth discovery procedure is conducted in a streaming manner to efficiently handle the streaming data. In other words, at each epoch, the shares of clients' sensed data will be scanned only once at each server.

Once the encrypted truth discovery procedure at each epoch is completed, the framework in the present embodiment supports transparent and streamlined knowledge monetization by leveraging blockchain-based technology, preferably with quality-aware rewards delivered to the clients 102 who contributed their data. Particularly, at the end of each epoch, the servers $S_0$ and $S_1$ independently encrypt and commit its corresponding share of the learned truth for the sensing task and of each client's weight to a blockchain, preferably also on the server (e.g., the same or other computer systems), for transparent and streamlined knowledge monetization with the requester 106. In the system 100 of FIG. 1, the requester 106 is able to access or communication with the server 104 through a requester device or interface.

Knowledge monetization in the present invention may operate under various kinds of models. In one example, the two cloud servers jointly initiate the crowdsensing application with the purpose of making profit by selling the learned truths to requester who shows interests. And the clients are also rewarded in return, preferably according to their weights. In another example, the requester initiates the crowdsensing application and employs the two cloud servers to continuously collect sensed data from the clients and perform streaming truth discovery. The two cloud servers get paid by the requester for the crowdsensing service, and the clients also obtain quality-aware rewards in return, preferably according to their weights.

B. Security Goals and Threat Assumptions

The present embodiment has two main security goals.

First, before knowledge monetization is initiated, the design aims to ensure that the two cloud servers learn nothing useful on its own. Preferably, the processing of the clients' sensed data at the cloud is conducted in the ciphertext domain throughout the streaming truth discovery procedure so that the two cloud servers are oblivious to the underlying private data. The two cloud servers in the present embodiment can be considered as non-colluding semi-honest adversaries. Preferably, each of the cloud servers will follow the protocol specification, and is interested in independently learning individual clients' sensed data.

Second, for blockchain-based knowledge monetization, the present design primarily aims to ensure monetization fairness and knowledge confidentiality. In terms of monetization fairness, preferably, the requester is able to obtain the knowledge once the offered payment is finalized on the blockchain and the cloud servers and each client can automatically obtain monetary rewards in return. Regarding knowledge confidentiality, preferably, the knowledge is not revealed to any parties prior to knowledge monetization and, once knowledge monetization is realised, the knowledge is only revealed to the requester and becomes his proprietary information (e.g., no longer available for others). In one embodiment, during knowledge monetization, the requester and the two cloud servers would want to protect their respective interests. That is, the requester is not willing to pay to the two cloud servers and clients in advance while the two cloud servers are not willing to reveal the truth shares (i.e., the useful information) to the requester in advance. In the present embodiment, individual clients' weights are not protected (could be made known) during knowledge monetization as the weight information is inherently required for transparent and automatic quality-aware reward. However, in embodiments without reward scheme, the clients' weights may be protected.

Preliminaries

A. Streaming Truth Discovery

Streaming truth discovery can be used to support real-time truthful aggregation (i.e., weighted aggregation) of sequentially incoming sensed data in crowdsensing while fully respecting historical aggregation results. The present embodiment uses streaming truth discovery, which, unlike common truth discovery techniques that run a batch algorithm over a static dataset iteratively, scans data once and performs real-time processing to update the truth (i.e., weighted aggregation result) and weights of data contributors incrementally, taking into account (e.g., integrating) historical results. Depending on the application context, various ways can be applied to control the effect of historical results on the latest truth. In one embodiment, exponential weighted moving average is applied to the data so that the historical effect of data on the latest result decreases exponentially.

Algorithm 1 in FIG. 2 gives the efficient streaming truth discovery algorithm in one embodiment of the invention. Note that for the simplicity of presentation, the algorithm is described by using the case of streaming truth discovery for one single sensing task. It should be readily appreciated that streaming truth discovery for multiple single sensing tasks can be performed simultaneously.

In Algorithm 1, the initial weights of all clients in the first epoch are initially set to 1. In the subsequent epoch l, with each client k's weight $w_k$, the truth $\Phi_l$ is first updated via weighted aggregation, as shown in Equation (1) in FIG. 2. Then, given the updated truth, the accumulated distances of all clients (e.g., the client's deviation from the truth) are updated based on Equation (2). Note: $d_m$ is a distance function chosen based on the targeted application scenario, $\lambda$ is a decay rate to ensure that the more recent data will have a more important effect in weight estimation. In one example, the distance function $d_m$ used is squared-error $d_m=(x_l^k-\Phi_l)^2$. Also, with the updated accumulated distances, the weight $w_k$ for each client k can be calculated using Equation (3).

B. Garbled Circuit

A. C. Yao, "How to generate and exchange secrets (extended abstract)" in Proc. of FOCS, 1986 has disclosed a garbled circuit that enables two parties, with private input x and y respectively, to jointly compute an arbitrary function $f(x, y)$, without leaking information about their private inputs beyond the function output. Specifically, one party named the garbler first generates and garbles a circuit that computes $f(\cdot)$. Then, the garbled circuit and the garbled input x̃ corresponding to its input x are given to the other party named evaluator. To avoid leaking its private input to the garbler, the evaluator runs an oblivious transfer protocol (OT) with the garbler to learn the garbled input y that corresponds to its input y. With x̃ and ỹ, the evaluator can now evaluate the garbled circuit and learn the function output $f(x, y)$.

Mining Truthful Knowledge Through Privacy-Preserving Streaming Truth Discovery

This section illustrates how crowdsensing with privacy-preserving streaming truth discovery is enabled in the present embodiment for producing truthful knowledge that can later be monetized via blockchain-based technology. To simplify illustration, the sensed data is referred below as sensing values.

A. Design Overview

To support privacy-preserving streaming truth discovery in a mobile-friendly and cost-effective manner, the present embodiment utilizes a lightweight cryptographic primitive, i.e., secret sharing, for protecting each client's sensing values. Specifically, at each epoch, given a sensing value x, a client splits it into two shares $[x]_0$ and $[x]_1$, by randomly choosing $[x]_0 \in F_q$ and constructing $[x]_1=x-[x]_0 \in F_q$, where F is a finite field and q is a large prime. Denote this additive secret-sharing scheme as SS(·). The cloud server $S_0$ holds $[x]_0$ while the cloud server $S_1$ holds $[x]_1$. Then, the two cloud servers jointly perform secure streaming truth discovery algorithm based on the shares. As a result, at each epoch, each cloud server obtains one share of the truth for each task and one share of each client's weight.

The following describes how to securely perform the atomic operations underlying the streaming truth discovery algorithm based on the shares of clients' sensing values. The following first considers how secure addition and multiplication can be performed. The goal in this instance is to add or multiply the shares of two inputs, e.g., $[x]_i$ and $[y]_i$, so as to allow cloud server $S_i (i \in \{0,1\})$ to get a share $[x+y]_i$ or $[x-y]_i$ without leaking private inputs x and y to both cloud servers. For the addition operation, the shares can be readily added by having $S_i$ compute $[x+y]_i=[x]_i+[y]_i$. For multiplication, if one of the inputs is a constant $A \in Fq$, $S_i$ computes as $[Ay]_i=A[y]_i$. Denote multiplication by a constant as $Mul_c([y]_i, A)$. If both of the two inputs are shared values, a viable technique for multiplication could be applied.

In one embodiment, the design adapts a multiplication triplet technique disclosed in D. Beaver, "Efficient multi-party protocols using circuit randomization," in Proc. of CRYPTO, 1991 to support multiplication over secret-shared values. Suppose that the cloud servers already share a multiplication triplet (a, b, c)$\in F_q^3$ where a and b are random values and a·b=c$\in F_q$. Beaver's technique implies that multiplication over shared values x and y can be performed as follows. In particular, each $S_i$ locally computes $[u]_i=-[a]_i$ and $[v]_i=[y]_i-[b]_i$. Then, each $S_i$ broadcasts $[u]_i$ and $[v]_i$. Each $S_i$ can reconstruct u and v, and further compute the share $$[x \cdot y]_i = u \cdot \frac{v}{2} + u \cdot [b]i + v \cdot [a]i + [c]i.$$

Such multiplication over secret-shared values is denoted by $Mul_{tri}([x]_i, [y]_i)$. To generate the multiplication triplet, one option is to run a cryptographic protocol between the two cloud servers. However, this option could be expensive. For higher cost efficiency, it is preferred that the multiplication triplets are generated on the client side, so that the expensive cryptographic protocol for multiplication triplet generation is avoided.

Besides secure addition and multiplication operations, it is observed that secure division and logarithm operations may also be required. As these operations may be difficult for direct handling under the secret sharing technique, garbled circuits can be applied to securely reconstruct original values, perform the operations, and secret-share the computation result among the two cloud servers again for future processing. In one embodiment, the idea is to let $S_0$ provide $S_1$ with a garbled circuit inside which their shares are combined, and division and/or logarithm computation is performed over the recovered data. The evaluation of the garbled circuit on the $S_1$ side will output a masked result $m-\in F_q$, where in is the computation result and r is a random value chosen by $S_0$. So, $[m]_1=m-r$ is the share of in for $S_1$, while $[m]_0=r$ is the corresponding share for $S_0$.

For the non-linear logarithm function, it may be difficult to be efficiently computed inside the garbled circuit. In this case, a secure computation friendly approximation for the logarithm function may be required for efficiently support in the encrypted domain. One option would be to approximate such function by high-degree polynomials, e.g., Taylor series expansion. However, the handling of high-degree polynomials in the encrypted domain is generally not efficient. Thus, one embodiment applies approximation by low-degree polynomials and particularly the technique of piecewise linear polynomial approximation. In this case, the non-linear logarithm function is approximated via a set of piecewise continuous polynomials, in which the polynomial degree is 1. Consequently, the logarithm function inside the garbled circuit can be replaced by relatively lightweight operations like comparison, addition, and (depth-1) multiplication.

B. Detailed Construction

The construction in the present embodiment includes three steps at each epoch l. To handle floating-point numbers, a scaling factor L is used to scale up a fractional value into an integer if needed. Note that all intermediate and final values (except constants) at each epoch are secret-shared between the two cloud servers $S_0$ and $S_1$.

Step 1: Data Shares Submission

In this phase of epoch l, each client k first splits the sensing value $x_l^k$ into two shares via $([x_l^k]_0, [x_l^k]_1) \leftarrow SS(x_l^k)$. Besides, each client k also randomly generates two multiplication triplets $Tri_0=(a_0, b_0, c_0)$ and $Tri_1=(a_1, b_1, c_1)$, and splits each of them into two shares via $SS(\bullet)$. Then, each client k submits the share $\{[x_l^k]_i, [Tri_0]_i, [Tri_1]_i\}$ to the cloud server $S_i$, via a secure and authenticated channel.

Step 2: Truth Shares Update

In the first epoch, the weight and accumulated distance of each client k are first initialized as constants by each of the cloud servers. Then, each cloud server $S_i$ can locally update its share of truth $\Phi_i$ via Equation (a) in FIG. 3. In the subsequent epochs, each cloud server only has a share of the weight and sensing value of each client k. Hence, to compute the a share of the multiplication result $[w_k \cdot x_l^k]_i$, i.e., weighted sensing values, the servers need to invoke $Mul_{tri}$. Particularly, the servers will use $Tri_0$ submitted from each client k as the triplet used in this multiplication operation. Subsequently, to update the truth $\Phi$ securely from the shares of the weighted sum of sensing values $([t]_0,[t]_1)$ and the shares of the weights $([z]_0,[z]_1)$, they engage in a garbled circuit based protocol, which is denoted as $GC_{div}([t]_i,[z]_i)$ in Equation (c) in FIG. 3:

$S_0$ prepares a garbled circuit that takes as input the garbled values of $[t]_0$, $[t]_1$, $[z]_0$, $[z]_1$, and a randomly chosen mask value r. Then, $S_0$ sends the garbled circuit and the garbled values ($[\widetilde{t}]_0$, $[\widetilde{z}]_0$, $\tilde{r}$) to $S_1$.

$S_1$ runs an oblivious transfer protocol with $S_0$ to obtain its garbled values $[\widetilde{t}]_1$ and $[\widetilde{z}]_1$. Then, with the given garbled values $[\widetilde{t}]_0$, $[\widetilde{z}]_0$, $[\widetilde{t}]_1$, $[\widetilde{z}]_1$, and $\tilde{r}$, $S_1$ evaluates the garbled circuit and obtains output $\Phi-r$, which is the truth share $\Phi_1$ on the $S_1$ side.

Step 3: Weight Shares Update

After updating the truth shares, the weight shares can then be securely updated. First, the squared error $d_k=(x_l^k-\Phi)^2$ needs to be computed for each client k in the encrypted domain using Equation (d) in FIG. 4. Particularly, the two inputs are both $[d]_i=([x_l^k]_i-\Phi_i$, and the second triplet $Tri_1$ is used. Then, the accumulated distance st(k) for each client k is updated via $[st(k)]_i \cdot \lambda+[d_k]_i$. $\lambda \in [0,1]$ is used as a decay rate to control the impact of historical sensing values on the current weight update. Based on $[st(k)]_i$ and the sum of all accumulated distances $[st^*]_i$, the weight for each client k can be updated. Similar to the truth share update phase, this is done by letting the two cloud servers engage in a garbled circuit based protocol, denoted as $GC_{div+log}([st(k)]_i, [st^*]_i)$. It should be noted that this protocol is operating in a way similar to the one in the truth share update phase, where $S_0$ is the generator and $S_1$ is the evaluator of the garbled circuit. Inside $GC_{div+log}$, the shares are first combined to recover the original values, then division and approximated logarithm are conducted over the original values to generate the masked result, and eventually each cloud server obtains a secret-shared result. After running the garbled circuit based protocol, $S_i$ obtains the weight share $[w_k]_i$ for each client k.

To simplify illustration, the above design is described mainly focusing on a single sensing task. It should be appreciated that the proposed design can readily support the scenario of multiple sensing tasks by slightly modifying the secure truth update and weight update algorithms. First, the truth share t of each sensing task n needs to be updated separately in the truth update step. Second, the accumulated distance sum across all sensing tasks need to be computed, i.e., $[st^*]_i = \Sigma_{n=1}^{N} \Sigma_{k=1}^{K}[st(k)(n)]_i$, where N is the number of sensing tasks and $([st(k)(n)]_i$ denotes the state of client k for sensing task n. Client k's state $[st(k)]_i$ is computed as $[st(k)]_i = \Sigma_{n=1}^{N}[st(k)(n)]_i$, and then weight estimation is performed over $[st(k)]_i$ and $[st^*]_i$ to update its weight share.

The present invention is not limited to the streaming truth discovery algorithm described above. Rather, the present invention also covers other algorithms, as long as the operations of the underlying plaintext algorithm can be decomposed into common arithmetic operations (addition, multiplication, and division), and some non-linear function.

C. Security Guarantees

The above design ensures that under the non-colluding and honest-but-curious adversary model, the two cloud servers learn nothing about the client's private sensing values throughout the procedure of secure streaming truth discovery.

At each epoch, using one client as an example, each cloud server first receives a share of all of the client's sensing values and a share of the multiplication triplets from. The security of the secret sharing technique ensures that nothing is revealed to each cloud server. Then, to conduct truth update and weight update, the two cloud servers do not only operate their respective secret-shared values locally but also interact with each other. In the present embodiment, the interactions are either based on the Beaver's multiplication technique to perform secure multiplication, or are based on garbled circuits to perform secure division and/or (approximate) logarithm. The security properties of the Beaver's technique and garbled circuits ensure that nothing is revealed to each cloud server from the interactions. From the interactions, each cloud server only obtains a share of the computation result.

Note that in the present design embodiment, it is assumed that the sensing values from the clients are well-formed, i.e., they are within a proper range. However, the present design embodiment can also be extended to handle malicious clients that provide malformed sensing values. For example, it is possible t integrate the latest secret-shared non-interactive zero knowledge proofs for efficiently checking whether a secret-shared sensing value is within a proper range.

Blockchain-Based Knowledge Monetization with Quality-Aware Reward Mechanism

With the truth shares, the present embodiment also presents how to support full-fledged blockchain-based knowledge monetization.

A. Design Rationale

The design of the present embodiment focuses on introducing how to establish a transparent and fair knowledge market, where everyone can browse and buy knowledge (i.e., learned truths) with fairness. This is catered for an application model in which the two cloud servers jointly initiate the crowdsensing application to make profit by selling the learned truths to the requester. It should be noted that other embodiments of the invention would support an alternative application model where the requester initiates the crowdsensing application.

The design of the present embodiment aims to provide a knowledge market with the following properties:
1) Transparency and streamlined processing
2) Monetization fairness with (on-chain) knowledge confidentiality
3) Automatic and quality-aware rewards for clients.

First, to enable end-to-end visibility and streamline the process, in the present embodiment, the knowledge market is deployed based on blockchain. Here, available knowledge and their corresponding metadata are committed and became publicly accessible, and clients are aware of the on-going knowledge monetization processes. Also, both the requester and servers need only to interact with the blockchain, which will automatically execute the monetization process with guaranteed correctness.

It is necessary to achieve monetization fairness with knowledge confidentiality. Fairness should be deemed as a natural requirement in knowledge monetization. For one thing, the requester should learn the knowledge once money is paid to the cloud servers and clients. For another, the cloud servers and clients should get paid once the knowledge is revealed to the requester. As blockchain inherently does not provide on-chain data privacy, directly posting the knowledge shares on the blockchain will compromise knowledge confidentiality. So, in the present embodiment only stores the encrypted knowledge shares on the blockchain.

To securely transfer the decryption keys to the requester with fairness, one method would be to let the cloud servers first commit the decryption keys to the blockchain, and later post them on the blockchain to claim the payment. However, this method still does not ensure knowledge confidentiality as the encrypted knowledge shares are also publicly accessible on the blockchain.

To address this problem, the present embodiment provides a new protocol that leverages smart contract and customized protection techniques to ensure fairness with knowledge confidentiality. Particularly, in this embodiment, only the masked keys are committed on the blockchain, and the masks are securely transferred by encrypting them with the symmetric keys that are generated by the offering requester. Hence, even the masked keys are posted on the blockchain for verification later, only the requester can unmask them and recover the decryption keys. In one embodiment, to further ensure knowledge confidentiality after monetizing the knowledge, the sold knowledge is permanently removed from the market. However, in other embodiment, the knowledge may be rented or otherwise remained.

Preferably, this design embodiment also provides automatic quality-aware reward for the clients via the smart contract. After completing a knowledge monetization process, i.e., after a requester pays and gets the knowledge, the clients are rewarded, preferably according to the quality (i.e., weights) of their contributed sensing value.

B. The Proposed Protocol

At a high level, the proposed knowledge monetization protocol comprises three phases, i.e., commit, offer, and harvest. First, in the commit phase, the cloud servers upload the encrypted knowledge shares, masked keys, and weight shares of clients to the knowledge market for sell. Second, in the offer phase, the requester C issues an offer to try buying the knowledge pertaining to his interests. Finally, in the harvest phase, if a knowledge offer is settled, the requester C recovers the knowledge, the cloud servers are rewarded equally, and quality-aware rewards are made to the contributed clients.

In the following protocol description, consider that the knowledge shares $\Phi_0$ and $\Phi_1$ at epoch l are jointly discovered by the cloud servers, and a requester C wants to learn $\Phi$ after browsing the knowledge market. In this embodiment, the blockchain is trusted in terms of execution correctness and availability, but not for privacy. The blockchain serves as a ledger that maintains balances for all involved parties, and correctly executes arbitrary self-enforcing programs, i.e., smart contracts. In this description, the terms blockchain and ledger are used interchangeably unless otherwise stated. In order to facilitate better understanding of the protocol of this embodiment, two key features of the smart contract in the knowledge monetization process is provided below:

(i) Timing and Round-based Execution: A smart contract has a timer that is modeled as a discrete variable T and increments in rounds. In each round, messages arriving at the smart contract are executed at the beginning of the next round, which starts when T increases.

(2) Entity Identifiers: The cloud servers, clients, and requester have identities, i.e., $S_0$, $S_1$, $\{P_k\}_{k=1}^{K}$, and C, associated with their accounts on the smart contract. They can send authenticated messages to the contract using their accounts' secret keys, and ledger[S] denotes S's balance in the ledger.

The protocol in one embodiment of the invention is as follows.

Commit Phase

The knowledge market is established on the ledger by letting cloud servers committing the knowledge shares, weight shares and masked keys:

$S_i$ computes id:=ID(l), where l is the epoch number and ID generates an identifier.

$S_i$ encrypts the share of knowledge $\Phi_i$ via $C_i$:=SENC($\Phi_i$, $k_i$), where SENC is a symmetric encryption scheme and $k_i$ is a randomly selected symmetric key.

$S_i$ encrypts the weight shares via $wt_k^i$:=XOR($[w_k]_i$,$p_k^i$), where $\{P_k^i\}_{k=1}^{K}$ are randomly selected.

$S_i$ masks the encryption key via $key_i$:=XOR($k_i$,$mask_i$) using a fresh nonce $mask_i$, and commits the masked key $cm_{key1}$:=Comm($key_i$).

$S_i$ sends commit:=(id, $cm_{keyi}$, $c_i$, $\{wt_k^i\}_{k=1}^K$) to Blockchain$_{KM}$, i.e., the smart contract on blockchain.

In addition to commitments, cloud servers can also attach some public metadata for id, e.g., a brief task description and its expected price, to facilitate trade. Upon receiving both commit requests from the cloud servers, Blockchain$_{KM}$ stores the ciphertexts and commitments, and labels knowledge id as available for sell. The detailed functionality is shown in FIG. 5.

Offer Phase

The requester C can browser the knowledge market, and send an offer to Blockchain$_{KM}$ to indicate interest. Suppose now C wants to buy the knowledge $\Phi$ with id. It randomly selects two symmetric keys $S_0$ and $S_1$, and encrypts them under the two cloud servers' public keys:

C generates $ct_0$:=ENC($S_0$. epk, $s_0$) and $ct_1$:=ENC($S_1$. epk, $s_1$), where ENC is a secure public key based encryption scheme.

C sends pay:=(id, $offer, $ct_0$, $ct_1$) to Blockchain$_{KM}$.

Upon receiving an offer from the requester, Blockchain$_{KM}$ checks whether the requester has enough balance in the ledger, and sends the corresponding key to each cloud server. After receiving the offer, each cloud server will evaluate it to decide whether or not to sell knowledge $\Phi$ to the requester. Specifically, if $S_i$ accepts the offer, it will use the symmetric key $S_i$, which is given from the requester, to encrypt the corresponding mask used in $key_i$, i.e., $sn_i$=SENC($mask_i$, $s_i$). The detailed functionality is shown in FIG. 6.

Harvest Phase

To claim the reward $offer, the masked key $key_i$, $sn_i$, and the masks used for decrypting the client weight shares are posted on the blockchain by the cloud server $S_i$. In particular, $S_i$ retrieves $key_i$ for id, and then sends harvest:=(id, $key_i$, $sn_i$, $\{p_k^i\}_{k=1}^K$) to Blockchain$_{KM}$.

Upon receiving the harvest requests from the cloud servers, Blockchain$_{KM}$ checks 1) whether both masked keys, i.e., $key_0$ and $key_1$, are posted; 2) whether the posted masked keys match the commitments attached to id. If both requirements are satisfied, the offer from the requester C is finalized and transferred to the cloud servers and clients, and harvest$_c$=($key_0$, $key_1$, $sn_0$, $sn_1$) is given to the requester for recovering knowledge. To split the reward, the cloud servers will get a share $soffer, and the remaining reward $coffer is given to the clients, preferably according to their committed weights. Specifically, Blockchain$_{KM}$ will unmask their corresponding weight shares and recover each client's weight, and reward each of them via Deg($w_k$), where $$Deg(wk) = \frac{w_k}{\sum_{k=1}^{K} w_k}.$$

The detailed functionality is shown in FIG. 7.

With harvest$_c$, the requester C obtains the decryption keys by unmasking $key_0$ and $key_1$, and then recovers the knowledge from the two encrypted knowledge shares:

C obtains decryption masks via $mask_0$:=SDEC($sn_0$, $s_0$) and $mask_1$:=SDEC($sn_1$, $s_1$).

C unmasks keys $k_0$:=XOR($key_0$, $mask_0$) and $k_1$:=XOR($key_1$, $mask_1$).

C computes knowledge shares $\Phi_0$:=SDEC($c_0$, $k_0$) and $\Phi_1$:=SDEC($c_1$, $k_1$).

C recovers the knowledge via $\Phi$:=$\Phi_0$+$\Phi_1$.

While the protocol of this embodiment is tailored for a transparent knowledge market, it may be modified to provide another embodiment that supports the alternative application discussed above. As the discovered knowledge will be sold to a specific requester initiating the crowdsensing application, fulfillment of offer needs to be further ensured, so that the cloud servers and clients are rewarded even if the requester later cancels the offer, as they have wasted or spent resources. In one embodiment, a proper offer will be issued by that requester in the offer phase. Here, the requester may have to deposit money and commit key ciphertexts on the blockchain in advance. Later, after the cloud servers commit knowledge to the blockchain, an offer is automatically triggered.

C. Protocol Analysis

Monetization Fairness

The fairness in the above knowledge monetization protocol is two-fold: the requester obtains the knowledge once he (or she, mentioned once and for all) pays, and the cloud servers and clients are rewarded once they reveal the knowledge. Recall that in the above protocol embodiment, the requester should first commit an offer via the smart contract before he initiates the knowledge monetization process. Then, only when both cloud servers provide the decryption materials to the requester via the blockchain, the monetization process will succeed and the cloud servers and clients are rewarded. If either of the cloud servers does not accept the offer and provide the material, the committed payment of a requester will be aborted by the smart contract automatically and returned to the requester.

Knowledge Confidentiality

The above protocol embodiment preserves knowledge confidentiality. That is, before knowledge monetization, the knowledge is not revealed to any parties. Once the knowledge monetization is done, the knowledge is only revealed to the requester and becomes his proprietary information. In particular, The above protocol embodiment provides the following theorem.

Theorem 1: Assuming the commitment scheme Comm is computational hiding and perfectly binding, the encryption schemes ENC and SENC are perfectly correct and semantically secure, the masks for encryption are randomly generated, and the two cloud servers do not collude, the above protocol for knowledge monetization guarantees knowledge confidentiality before and after the monetization processing.

Proof Sketch

First, analyse knowledge confidentiality before monetization processing. Recall that the knowledge shares are encrypted using random symmetric keys of the cloud servers, via SENC($\Phi_i$, $k_i$). Thus, the requester can learn nothing from the posted knowledge shares ciphertexts on the market because he does not know the decryption keys. Also, the knowledge shares are encrypted independently by the two cloud servers. Each of the cloud servers cannot learn information from the other cloud server's knowledge share ciphertexts. Therefore, before the knowledge monetization process, the knowledge is not revealed to any party.

Second, analyse knowledge confidentiality after monetization processing. Initially, the decryption keys for the knowledge shares are masked before committing, and the masks are given to the requester via SENC($mask_i$, $s_i$), where $s_i$ is the symmetric key selected by the requester. Here, $s_0$ and $s_1$ are encrypted under each cloud server's public key, i.e., ENC($S_i$.epk, $s_i$), before posting them on contract. Hence, posting the masked keys and encrypted masks on the blockchain will not leak information to others about the decryption keys, which ensures that the monetized knowledge is revealed only to the requester who has bought it. Also, after a knowledge monetization process, metadata of knowledge id, i.e., id; $cm_{key0}$ and $cm_{key1}$, are removed from the knowledge market. It ensures that the knowledge id cannot be monetized for a second time, and is owned by the requester as a private property.

Experiments

A. Implementation

The performance of the above privacy-preserving streaming truth discovery design and blockchain-based knowledge monetization protocol embodiment has been evaluated via a proof-of-concept implementation. The plaintext streaming truth discovery scheme I-CRH disclosed in Y Li, Q. Li, J. Gao, L. Su, B. Zhao, W. Fan, and J. Han, "*Conflicts to harmony: A framework for resolving conflicts in heterogeneous data by truth discovery,*" IEEE Transactions on Knowledge and Data Engineering, vol. 28, no. 8, pp. 1986-1999, 2016 were also implemented for accuracy comparison and validation. For cryptographic primitives, the standard cryptographic toolkit in Python was used. Specifically, AES was used for symmetric encryption and RSA was used for public key based encryption, with 256-bit key size and 2048-bit security level, respectively. And SHA-256 was used as the commitment scheme. All implementations except the smart contract and garbled circuit were in Python—the program contains more than 1400 lines of code. In the experiment, the Ethereum blockchain was used for test, and the smart contract is implemented with the Ethereum programming language Solidity with 240 lines of code. For garbled circuits, ObliVM-lang was used. A piecewise linear polynomial approximation could be used to approximate the non-linear logarithm function for evaluation inside the garble circuit. Apparently, by splitting the logarithm function into more pieces, the approximation result would be more accurate But this would also lead to an increase in the circuit size and computation overhead. Here, the approximation range was set as [0,1] and the base 2 logarithm function was approximated with 16 pieces. The polynomial expression of each interval was determined by fitting a smoothing spline with optimized switchover positions (i.e., knots).

In the experiment, the client side and cloud server side operations were tested on a Microsoft Azure standard D8s v3 instance (8 virtual CPU, 32 GB memory, and SSD access), with Ubuntu 16.04 LTS operating system. The smart contract was deployed on a test RPC environment that runs on the instance above. In the experiments, synthetic datasets were used and the decay rate $\lambda$ was set to 0.5. Particularly, the sensing values of clients are drawn from normal distribution. The mean value was used to represent the ground truth, and vary the standard deviation for each client to resemble their respective data quality levels. Note that the correctness and performance of the present design embodiment depends on the underlying cryptographic primitives, regardless of the type of dataset being evaluated. For the number of clients or sensing tasks, a parameter setting which has the same order of magnitude as in I-CRH was used. In particular, the number of clients and sensing tasks in the experiment ranged from 4 to 12, and from 10 to 30 respectively for demonstration. Such a parameter setting is consistent with some real-world crowdsensing applications, e.g., urban air quality monitoring and noise monitoring, where there are usually just a few tens of clients.

B. Performance Evaluation

Accuracy

Figure 8:
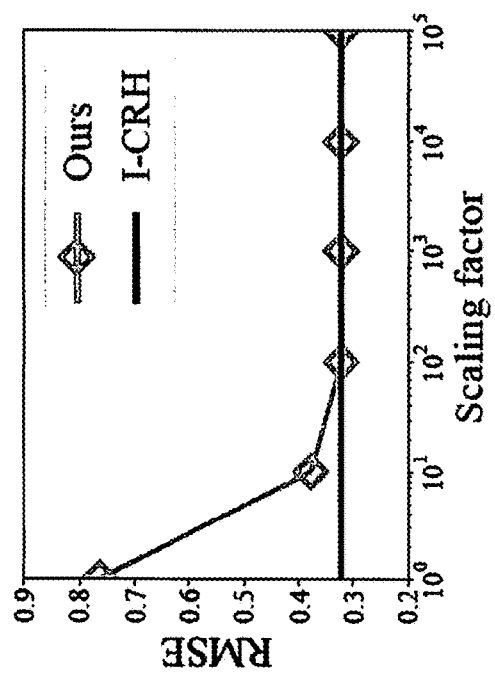
FIG. 8 is a graph showing experimental variation of root of mean squared error against scaling factor for the method of the present invention and an existing plaintext streaming truth discovery scheme I-CRH.

First, the accuracy of the privacy preserving streaming truth discovery design is measured. Here, for demonstration, the accuracy result was reported through a continuous trial over 20 epochs, with a sensing task and 10 clients. The standard root of mean squared error (RMSE) was used to measure the difference between the estimated ground truth and the ground truth. Recall that a scaling factor L was adopted to round fractional data values and polynomials for approximating the logarithm function. First, the accuracy was measured by varying the scaling factor L. In particular, L was varied from $10^0$ to $10^5$, and the RMSE result of the present design embodiment was compared with that of I-CRH, as illustrated in the graph of FIG. 8. It can be observed from FIG. 8 that with a scaling factor L more than $10^2$, the RMSE result of the present design embodiment can well match that of I-CRH. That is, with a properly chosen scaling factor, the accuracy can be guaranteed. In the following experiments, the scaling factor L was configured to be larger than $10^2$, i.e., $10^3$ as a conservative choice.

Figure 9:
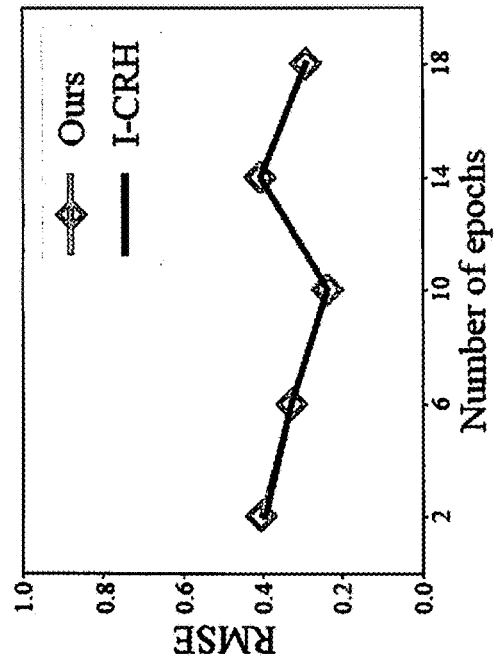
FIG. 9 is a graph showing experimental variation of root of mean squared error against number of epochs for the method of the present invention and an existing plaintext streaming truth discovery scheme I-CRH.

Next, with the configured scaling factor, the estimation error brought by the approximation of the logarithm function was measured. FIG. 9 compares the RMSE result (computed across all epochs) of the present design embodiment with that of I-CRH. It is observed that with the logarithm approximation for secure computation, the present design embodiment still achieves almost the same RMSE result as I-CRH.

Figure 10:
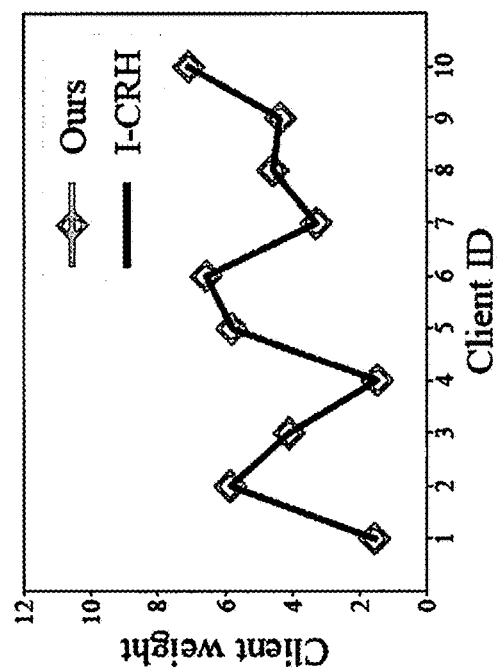
FIG. 10 is a graph showing experimental variation of client weight of different client IDs for the method of the present invention and an existing plaintext streaming truth discovery scheme I-CRH.

FIG. 10 compares the estimated client weights between the present design embodiment and I-CRH in a certain epoch as an example. It can be seen that the estimated client weights in the present design embodiment are consistent with I-CRH. Such consistency is actually observed at all epochs in the experiments. Essentially, the security design of the present design embodiment ensures the accuracy of streaming truth discovery.

Computation Efficiency

First the computation cost at the client side was measured. Recall that at each epoch, each client is only required to generating shares of their sensing values and two multiplication triplets. Share generation process with 100 sensing tasks was evaluated. It took around 0.48 ms and 2.02 ms for generating shares of sensing values and of multiplication triplets, respectively. This result indicates the practical computation efficiency on the client side.

Figure 11:
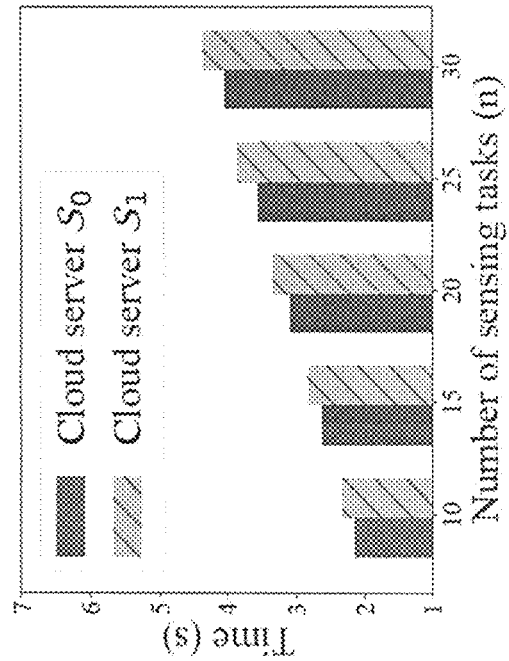
FIG. 11 is a graph showing experimental variation of server cost (time) against number of clients for the two cloud servers in the system of FIG. 1 (for sensing tasks)
Figure 12:
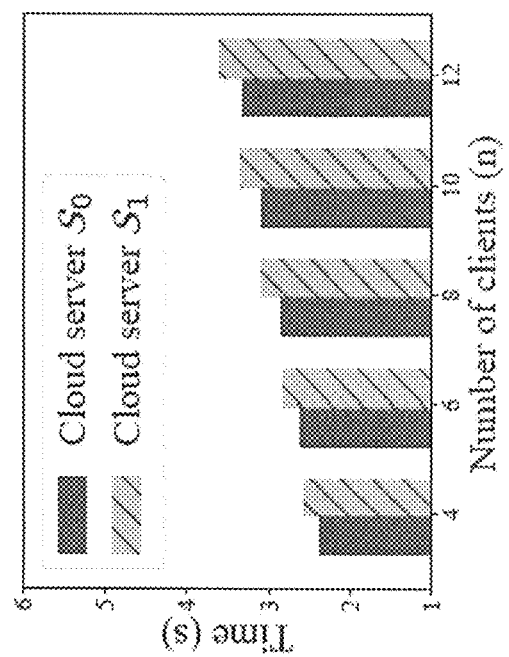
FIG. 12 is a graph showing experimental variation of server cost (time) against number of sensing tasks for the two cloud servers in the system of FIG. 1 (for 10 clients)

Next, the computation cost on the cloud server side for privacy-preserving streaming truth discovery is tested. FIG. 11 shows the computation time cost of the two cloud servers $S_0$ and $S_1$, with regard to the number of clients. As expected, it can be observed that the computation time cost of both cloud servers scales with the increase of clients. FIG. 12 further shows the computation cost on $S_0$ and $S_1$ at each epoch, with regard to the number of sensing tasks. It is indicated that the computation cost on $S_0$ and $S_1$ increased as the number of tasks grows. Overall, it only takes a few seconds for truth discovery at each epoch in the tests. It is noticed that the computation cost on the cloud servers is dominated by running the garbled circuit based protocols, and the computation over data shares are quite efficient (totally around 8 ms with 30 sensing tasks and 12 clients). Regarding the knowledge monetization process, the local computation cost of a cloud server or a requester for one sensing task with 10 clients was tested. On the requester side, the offer and harvest operations require 7.8 ms and less than 0.3 ms, respectively. On each cloud server side, it took 0.294 ms and 21 ms for the commit and harvest operations, respectively.

Blockchain Performance

The smart contract implementation in the present design embodiment consists of three main functions that reflect the functionalities in the Commit, Offer, and Harvest phases respectively. To evaluate the performance of the smart contract over blockchain, the knowledge monetization process was simulated by the following four steps: 1) contract deployment; 2) transmission of transaction from $S_0$ and $S_1$ respectively, for sequentially committing data; 3) transmission of offer transaction to trigger the knowledge monetization process; 4) transmission of harvest transactions to claim the payment, and to trigger automatic quality-aware reward for the clients.

Figure 13:
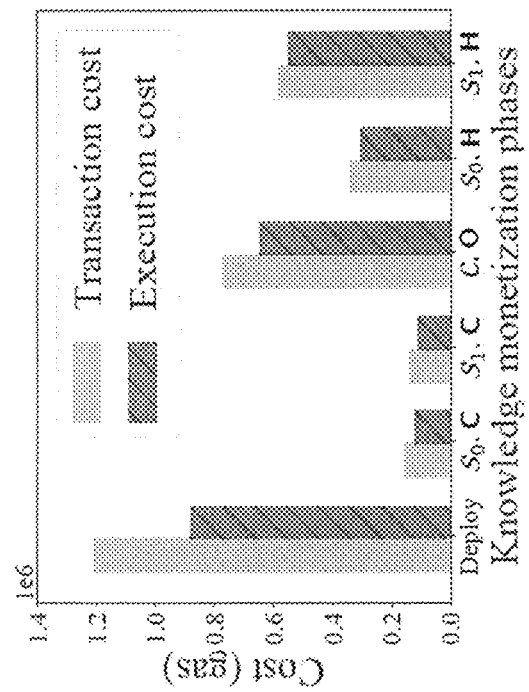
FIG. 13 is a graph showing experimental variation of cost (both transaction cost and execution cost) at different knowledge monetization phases.

FIG. 13 shows the blockchain cost in each step of the knowledge monetization process. In particular, there are two types of cost for processing a transaction, i.e., transaction cost and execution cost. The transaction cost is related to the size of transaction data, while execution cost evaluates the computational operations in the Ethereum state machine. Note that the cost on the Ethereum blockchain is evaluated in gas, associated with a gas price measured by the Ethereum currency called ether. From FIG. 13, it can be seen that in Step 4, the first harvest transaction sent from $S_0$ consumes less gas than the $S_1$'s harvest transaction which comes second. This is because $S_0$'s harvest transaction does not trigger the weight recovery and monetization process, since $S_1$ has not sent its harvest transaction. After receiving $S_1$'s harvest transaction, the smart contract recovers the weights, and rewards the cloud servers and clients, as reflected by the increased cost on blockchain.

With the gas price $2 \times 10^{-9}$ ether and exchange rate 1 ether=USD $300.85 on the official Ethereum network, the contract deployment cost is about 2.7 million gas ($1.62), and the total cost of the entire knowledge monetization process is about 3.7 million gas ($2.22) when the smart contract is deployed on the official Ethereum blockchain. Note that the contract deployment is a one-time cost. In addition, since the implementation of the underlying blockchain is agnostic to the present design embodiment, a lower financial cost may be expected by deploying the smart contract to a permissioned blockchain system, e.g., Azure consortium blockchain service.

Exemplary Applications

The system and method in the present invention are potentially applicable in various applications.

One potential application is to enable secure healthcare applications over crowdsourcing data. Nowadays, healthcare data are collected by the medical researchers and biotechnology companies to help conduct better analytics, more efficient practices and overall better patient care. Due to raising privacy concerns on the personal healthcare data, there is a growing trend to encrypt the data before outsourcing it. Also, the client who contributed healthcare data is expected to be rewarded according to its contribution for the medical research/analysis, so that more clients will be incentivized to provide their useful data. During the entire knowledge/analysis discovery over the healthcare data, the service providers know nothing about the sensitive data of each client. Eventually, the discovered knowledge can be sold to a requester (hospital or researcher) with guaranteed confidentiality, and the contributed clients will be fairly rewarded accordingly to their data quality.

Another potential application is to build a transparent knowledge market that truthful knowledge can be discovered and contributed by all individuals. With the rapid use of "wisdom of the crowd" to discover useful knowledge and make decisions in various areas (e.g., stock market), a growing number of users are fond of contributing their data/opinion to conduct some crowdsourcing tasks and earn money. However, their contributed data/opinion privacy is not guaranteed, and the leaked information could later be reused without being noticed by the original client. Here, the present invention guarantees data privacy on the contributed data. Also, the users are guaranteed to be rewarded automatically through the smart contract on the blockchain. All the transactions of the knowledge are publicly audit-able, so neither the service providers nor the knowledge requester can cheat the users and fraudulently retrieve the knowledge without rewarding the users.

Exemplary System

Figure 14:
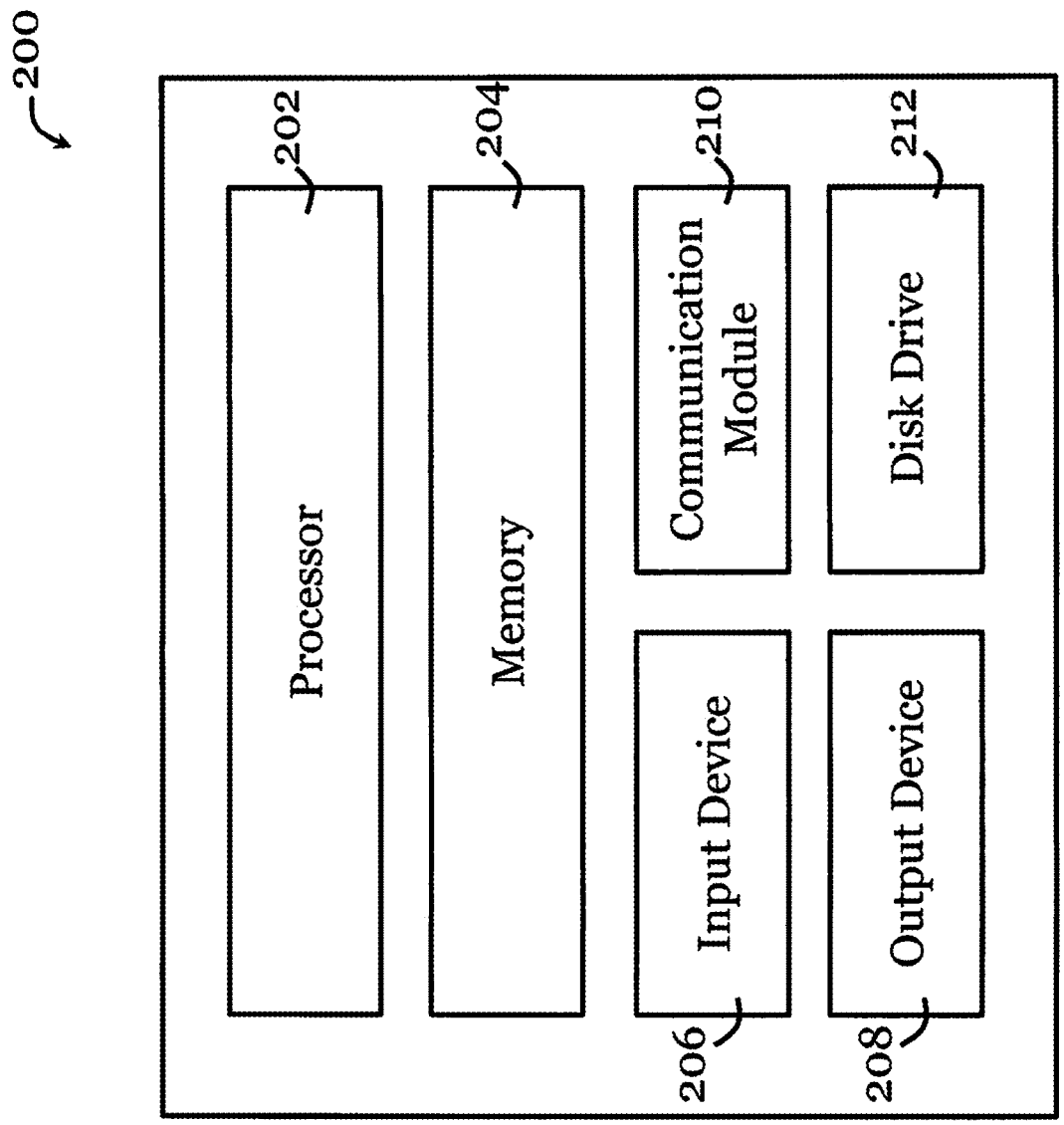
FIG. 14 is a functional block diagram of an information handling system arranged to be used in the system of FIG. 1 or to be used to perform the method of the present invention.

Referring to FIG. 14, there is shown a schematic diagram of an exemplary information handling system 200 that can be used as a server, a client device, a requester interface that allows the requester to access the system, or other information processing system, for realizing the method in one embodiment of the invention. The information handling system 200 may have different configurations, and it generally comprises suitable components necessary to receive, store, and execute appropriate computer instructions, commands, or codes. The main components of the information handling system 200 are a processor 202 and a memory unit 204. The processor 202 may be formed by one or more CPU, MCU, controllers, logic circuits, Raspberry Pi chip, etc. The memory unit 204 may include one or more volatile memory unit (such as RAM, DRAM, SRAM), one or more non-volatile unit (such as ROM, PROM, EPROM, EEPROM, FRAM, MRAM, FLASH, SSD, NAND, and NVDIMM), or any of their combinations. Preferably, the information handling system 200 further includes one or more input devices 206 such as a keyboard, a mouse, a stylus, an image scanner, a microphone, a tactile input device (e.g., touch sensitive screen), and an image/video input device (e.g., camera). The information handling system 200 may further include one or more output devices 208 such as one or more displays (e.g., monitor), speakers, disk drives, headphones, earphones, printers, 3D printers, etc. The display may include a LCD display, a LED/OLED display, or any other suitable display that may or may not be touch sensitive. The information handling system 200 may further include one or more disk drives 212 which may encompass solid state drives, hard disk drives, optical drives, flash drives, and/or magnetic tape drives. A suitable operating system may be installed in the information handling system 200, e.g., on the disk drive 212 or in the memory unit 204. The memory unit 204 and the disk drive 212 may be operated by the processor 202. The information handling system 200 also preferably includes a communication module 210 for establishing one or more communication links (not shown) with one or more other computing devices such as servers, personal computers, terminals, tablets, phones, or other wireless or handheld computing devices. The communication module 210 may be a modem, a Network Interface Card (NIC), an integrated network interface, a radio frequency transceiver, an optical port, an infrared port, a USB connection, or other wired or wireless communication interfaces. The communication links may be wired or wireless for communicating commands, instructions, information and/or data. Preferably, the processor 202, the memory unit 204, and optionally the input devices 206, the output devices 208, the communication module 210 and the disk drives 212 are connected with each other through a bus, a Peripheral Component Interconnect (PCI) such as PCI Express, a Universal Serial Bus (USB), an optical bus, or other like bus structure. In one embodiment, some of these components may be connected through a network such as the Internet or a cloud computing network. A person skilled in the art would appreciate that the information handling system 200 shown in FIG. 14 is merely exemplary and different information handling systems 200 with different configurations may be applicable in the invention. For example, the client devices may be a mobile phone, a tablet, a desktop computer, a laptop computer, or the like. The requester device may be a mobile phone, a tablet, a desktop computer, a laptop computer, or the like. The server may be a cloud computing server with multiple computing units operably connected with each other. The server may alternatively be non-cloud based server.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include any appropriate arrangement of computer or information processing hardware capable of implementing the function described.

CONCLUSION

The above embodiment has provided a crowdsensing framework enabling private truthful knowledge discovery and full-fledged blockchain-based knowledge monetization system and method. The above embodiment enables privacy-preserving and efficient truth discovery over encrypted crowdsensed data streams for truthful knowledge discovery. Meanwhile, with careful integration of the newly emerging blockchain-based smart contract technology, the above embodiment allows full-fledged knowledge monetization. Tackling the challenges of monetization fairness and on-chain knowledge confidentiality, the customized knowledge monetization design in the above embodiment well respects the interests of knowledge seller and requester, with full support of transparency, streamlined processing, and automatic quality-aware rewards for clients. Extensive experiments on Microsoft Azure cloud and Ethereum blockchain have demonstrated the practically affordable performance of the proposed design.

It will be appreciated by persons skilled in the art that numerous variations and/or modifications may be made to the invention as shown in the specific embodiments without departing from the scope of the invention as defined in the claims. The described embodiments of the invention should therefore be considered in all respects as illustrative, not restrictive.

For example, the present invention is not limited to crowdsensing applications. The present invention may be applied to crowdsourcing applications, or like applications that leverage manual or machine input from different client devices. The created useful knowledge need not be blockchain-based but is preferably blockchain-based. Various block-chain based technology or platform may be employed. The transaction of the useful knowledge, or the associated blockchain, need not be associated with money. It could be, alternatively or additionally, associated with other points, credits, or other incentives. The number of cloud computing servers may be any number larger than or equal to two (although two is preferred). The data-quality-weighting can be omitted in some embodiments. The reward as a result of the transaction can also be omitted in some embodiments. The reward can be a fixed reward, or a floating reward based on the data quality weighting. The useful knowledge purchased or otherwise transferred to the requester may be removed from the server, or alternatively, remained on the server. For example, the transaction of the useful information may be in the form of a loan (available for a certain period of time), not proprietary.

The invention claimed is:

1. A method for processing data and managing information, comprising:
receiving, at two or more cloud computing servers operably connected with each other, and from each respective one of a plurality of client devices, a respective streaming data set for a same sensing task, a respective first multiplication triplet and a respective second multiplication triplet,
wherein the streaming data set from each respective client device comprises sensed data sensed by one or more sensors of said client device and is encrypted at the respective client device,
wherein each respective streaming data set from a respective client device is divided by the respective client device into two or more streaming data set portions each received at a respective one of the two or more cloud computing servers,
wherein each respective first multiplication triplet from a respective client device is divided by the respective client device into two or more first multiplication triplet portions each received at a respective one of the two or more cloud computing servers, and
wherein each respective second multiplication triplet from a respective client device is divided by the respective client device into two or more second multiplication triplet portions each received at a respective one of the two or more cloud computing servers;
processing, at each respective one of the two or more cloud computing servers, the corresponding streaming data set portions and the corresponding first and second multiplication triplet portions received from the plurality of client devices to generate (i) respective share of a result for the sensing task using the first multiplication triplet portions and (ii) respective share of weight of the client devices using the second multiplication triplet portions, the weight of each of the client devices being associated with quality of the corresponding streaming data set provided by the client device;
encrypting, at each respective one of the two or more cloud computing servers, the corresponding share of the result;
facilitating creation or update of a blockchain based on all of the encrypted shares of the result so as to store the encrypted shares of the result in the blockchain; and
hosting the blockchain at the two or more cloud computing servers.

2. The method of claim 1, wherein the streaming data sets are encrypted by secret sharing.

3. The method of claim 1, wherein the processing of the streaming data set portions comprises updating an existing share of the result at the respective cloud computing server.

4. The method of claim 3, wherein the updating of the existing share of the result comprises applying a weighting to the data associated with the existing share of the result and the streaming data set portions received.

5. The method of claim 4, wherein the weighting comprises an exponential weighted moving average.

6. The method of claim 1, wherein each of the client devices includes a respective data-quality-weighting, and wherein the processing of the streaming data set portions comprises updating the data-quality-weighting of the respective client device based on the generated share of the result.

7. The method of claim 1, wherein for each respective cloud computing server the processing of the streaming data set portions is conducted in a ciphertext domain.

8. The method of claim 1, further comprising:
receiving, from a requester device, an indication of interest to purchase the result of the sensing task,
processing the indication of interest at the two or more cloud computing servers to determine whether to provide the encrypted shares of the result to the requester device;
providing the encrypted shares of the result to the requester device upon determining that the result should be provided to the requester device.

9. The method of claim 8, wherein the indication of interest comprises a purchase request and a payment.

10. The method of claim 9, wherein the payment from the requester device to the two or more cloud computing servers and the provision of the encrypted shares of the result to the requester device from the two or more cloud computing servers occur substantially simultaneously.

11. The method of claim 9, further comprising removing the encrypted shares of the result from the two or more cloud computing servers after providing the encrypted shares of the result to the requester device.

12. The method of claim 9, further comprising providing a reward to the respective client devices upon providing the encrypted shares of the result to the requester device.

13. The method of claim 12, wherein an amount of the reward to be provided to the respective client device is based on a data-quality-weighting of the respective client device.

14. The method of claim 1, wherein each respective streaming data set is comprised of a sensed value for the same sensing task and the sensed value is split into two or more shares by the respective client device.

15. A system for processing data and managing information, comprising:
two or more cloud computing servers operably connected with each other and arranged to:
receive, from a respective one of a plurality of client devices, a respective streaming data set for a same sensing task, a respective first multiplication triplet, and a respective second multiplication triplet,
wherein the streaming data set from each respective client device comprises sensed data sensed by one or more sensors of said client device and is encrypted at the respective client device,
wherein each respective streaming data set from a respective client device is divided by the respective client device into two or more streaming data set portions each received at a respective one of the two or more cloud computing servers,
wherein each respective first multiplication triplet from a respective client device is divided by the respective client device into two or more first multiplication triplet portions each received at a respective one of the two or more cloud computing servers, and
wherein each respective second multiplication triplet from a respective client device is divided by the respective client device into two or more second multiplication triplet portions each received at a respective one of the two or more cloud computing servers;
process, at each respective one of the two or more cloud computing servers, the corresponding streaming data set portions and the corresponding first and second multiplication triplet portions received from the plurality of client devices to generate (i) respective share of a result for the sensing task using the first multiplication triplet portions and (ii) respective share of weight of the client devices using the second multiplication triplet portions, the weight of each of the client devices being associated with quality of the corresponding streaming data set provided by the client device;
encrypt, at each respective one of the two or more cloud computing servers, the corresponding share of the result;
facilitate creation or update of a blockchain based on all of the encrypted shares of the result so as to store the encrypted shares of the result in the blockchain; and
host the blockchain at the two or more cloud computing servers.

16. The system of claim 15, wherein each respective streaming data set is comprised of a sensed value for the same sensing task and the sensed value is split into two or more shares by the respective client device.

17. A non-transitory computer readable medium for storing computer instructions that, when executed by a plurality of cloud computing servers, causes the cloud computing servers to perform a method for processing data and managing information, comprising:
receiving, at two or more cloud computing servers operably connected with each other, and from each respective one of a plurality of client devices, a respective streaming data set for a same sensing task, a respective first multiplication triplet, and a respective second multiplication triplet,
wherein the streaming data set from each respective client device comprises sensed data sensed by one or more sensors of said client device and is encrypted at the respective client device,
wherein each respective streaming data set from a respective client device is divided by the respective client device into two or more streaming data set portions each received at a respective one of the two or more cloud computing servers,
wherein each respective first multiplication triplet from a respective client device is divided by the respective client device into two or more first multiplication triplet portions each received at a respective one of the two or more cloud computing servers, and
wherein each respective second multiplication triplet from a respective client device is divided by the respective client device into two or more second multiplication triplet portions each received at a respective one of the two or more cloud computing servers;

processing, at each respective one of the two or more cloud computing servers, the corresponding streaming data set portions and the corresponding first and second multiplication triplet portions received from the plurality of client devices to generate (i) respective share of a result for the sensing task using the first multiplication triplet portions and (ii) respective share of weight of the client devices using the second multiplication triplet portions, the weight of each of the client devices being associated with quality of the corresponding streaming data set provided by the client device;

encrypting, at each respective one of the two or more cloud computing servers, the corresponding share of the result;

facilitating creation or update of a blockchain based on all of the encrypted shares of the result so as to store the encrypted shares of the result in the blockchain; and hosting the blockchain at the two or more cloud computing servers.

18. The non-transitory computer readable medium of claim 17, wherein each respective streaming data set is comprised of a sensed value for the same sensing task and the sensed value is split into two or more shares by the respective client device.

\* \* \* \* \*